Jan. 29, 1929.                                                                1,700,698
                        W. H. FULWEILER
                   METHOD FOR PURIFYING GASES
                     Filed Aug. 1, 1924
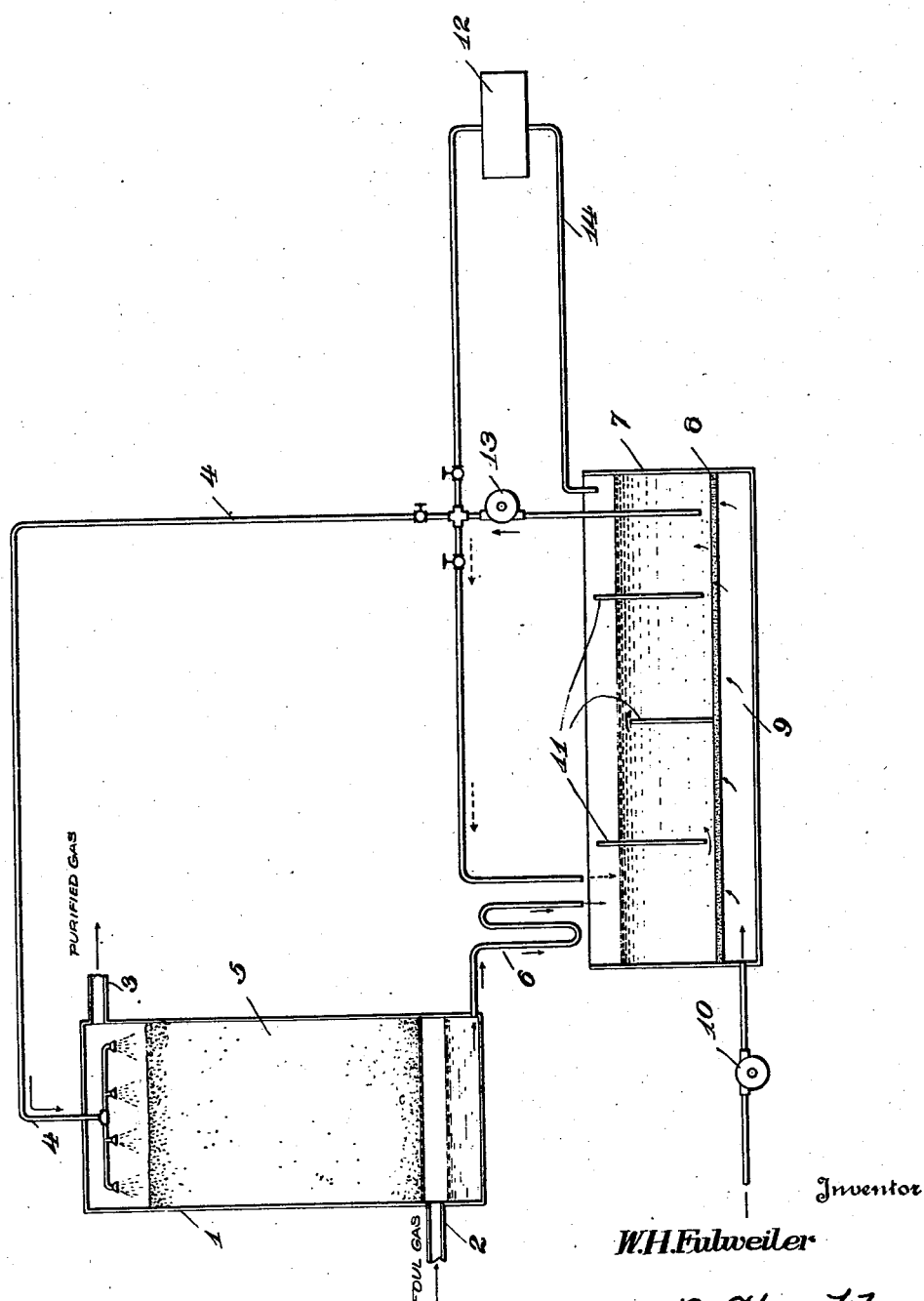
Inventor
W.H.Fulweiler
By Augustus B. Stoughton
                        Attorney Patented Jan. 29, 1929.

1,700,698

UNITED STATES PATENT OFFICE.

WALTER H. FULWEILER, OF WALLINGFORD, PENNSYLVANIA, ASSIGNOR TO THE U. G. I. CONTRACTING COMPANY, OF PHILADELPHIA, PENNSYLVANIA, A CORPORATION OF DELAWARE.

METHOD FOR PURIFYING GASES.

Application filed August 1, 1924. Serial No. 729,519.

Principal objects of the present invention are to economically and satisfactorily remove hydrogen sulphide from illuminating and other gases by scrubbing and in such a way that the scrubbing solution when foul is revivified or fitted for re-use without pollution of the surrounding atmosphere by hydrogen sulphide or other noxious gases; to provide for recovering free sulphur from the foul solution in the process of revivifying it or fitting it for re-use; to provide a rapid and continuous method of gas purification, involving the return of the sulphur-freed solution to the actifier to promote constant circulation coupled with desirable control to insure proper concentration of hydrogen sulphide in the admixture of foul and actified solution in order to minimize the formation of thio-sulphate and other objectionable bodies; to provide for selective oxidization of the foul solution under conditions for insuring positive control, and under conditions for oxidizing bodies of solution of relatively great depth as distinguished from bodies of relatively large surface exposure, and under conditions for causing the air while under proper control to enter the solution in a finely divided state; to provide for accelerating or decelerating the actifying process, and to provide comparatively simple and inexpensive means for reducing the invention to practice.

To these and other ends hereinafter set forth the invention in one of its aspects comprises the selective oxidization of the foul solution, with deposition or liberation of sulphur as such, principally or essentially to a body or bodies capable of combining with or taking on hydrogen sulphide in the re-use of the solution as distinguished from a body or bodies lacking that capability. In another of its aspects the invention comprises the provision of a scrubbing solution of an alkaline nature and which, when subjected to selective oxidization, gives rise to the production of more of the body or bodies capable of removing hydrogen sulphide from the gas in the scrubbing operation than to a body or bodies lacking that capability. The invention further comprises the process of revivifying or fitting foul solutions for re-use which consists in subjecting them to the action, under proper control, of air in a finely divided state, with resulting deposition of sulphur as such. The invention further consists in maintaining a substantially constant circulation of the solution, including the return and re-use of the sulphur-free solution for the purpose and with the result of securing the proper concentration of the admixture of foul and actified solutions in order to minimize the formation of thio-sulphate and other objectionable bodies. The invention further consists in the method and means for hastening the normalization of the operation; and in the method and means for controlling the supply of air required for oxidization, including means for breaking up the air into finely divided particles and supplying it in that state to bodies of solution of relatively great depth.

In practice this process is used for the removal of hydrogen sulphide from illuminating gas and it is carried out by scrubbing the gas with an aqueous solution of a salt that is sufficiently alkaline to absorb hydrogen sulphide from the gas, thus forming a hydro-sulphide or foul solution. In the second stage of the process the sulf-hydrate, hydro-sulphide or foul solution of substantially great depth and throughout that depth is oxidized by the action of air caused to enter the solution under more or less pressure and in a finely divided state so that the oxygen of the air will react with the hydrosulphide to the end that the hydro-sulphide is decomposed, re-forming the original salt and setting free sulphur. This second stage of the process may be referred to as a controllable oxidization because if the oxidization is too violent sodium thio-sulphate will be formed, while if it is still more violent sodium sulphate will be formed and both these salts are inactive for removing hydrogen sulphide so that the object is to cause the maximum amount of sulphur to go to free sulphur and the minimum amount to go to sulphate or other inactive salts in order that the process may be carried on with the minimum expenditure of salts.

In further describing the invention reference may be made to the accompanying drawing, which illustrates, principally in diagram, one form of apparatus in connection with which the process of the invention may be practiced.

A stream of gas flowing upwardly as from 2 to 3 in a tower 1 filled with some material 5 that will expose a large surface, such as coke, tiles and the like, is scrubbed with a downwardly flowing stream of absorbing liquid composed of an alkaline solution, for example, sodium carbonate, in the proportion, preferably, of 10 to 15 grams per liter. Such solutions will absorb from 40 to 60 grains of hydrogen sulphide per gallon, and the amount of solution used per thousand feet of gas is regulated with a view to removing the required amount of hydrogen sulphide, having regard to the initial amount present. Otherwise expressed, for a coke oven gas containing 600 grains of hydrogen sulphide per hundred cubic feet, it will be necessary to circulate about 100 gallons of solution per 1000 feet of gas in order to remove 600 grains of hydrogen sulphide per 100 feet of gas. The process may be practiced at a temperature above 70° F., and preferably at a temperature of 80 to 85° F. The solution, introduced at 4, leaves the tower or scrubber purifier through the seal 6 entering the actifier 7.

In scrubbing, commercial coke oven gas which contains carbon dioxide, some of the carbon dioxide is absorbed for a short time at the beginning of the operation and until it comes into equilibrium with the solution after which only a relatively small amount will be absorbed corresponding to the addition of fresh soda ash to the solution. In the case of cyanogen it is absorbed, in case sodium salts are used, forming sodium cyanide, and a portion of this sodium cyanide combines with hydrogen sulphide forming sodium sulpho cyanide so that a certain amount of soda is consumed in making up this loss.

The actifier 7 may embody any suitable tank or vessel capable of containing a considerable depth of the solution, for example, from 3 to 6 feet, or sufficient solution to take care of a half hour's pumping; and with provision for subjecting the solution throughout its depth to the action of controllable supplies of air introduced through the body of the solution in a finely divided state. One way of accomplishing the desired controllable oxidation, and as shown in the drawing, is through the medium of a porous diaphragm 8 which separates the actifier or solution container from what may be termed a pressure chamber 9 into which air is introduced under proper control as from a pump or blower 10. The diaphragm 8 is preferably porous stone or any equivalent thereof capable of sustaining the column of solution and of admitting thereto appropriate quantities of air in a finely divided state. The pump 10 affords a convenient and positive means for controlling the amount of pressure in the pressure chamber 9. The regulation or control of air for oxidization purposes is highly important. Practice has demonstrated that an appropriate amount is from 80 to 120 cubic feet of air per thousand feet of gas purified. Evidently, the amount of air required depends upon the amount of hydrogen sulphide in the gas.

The actifier or solution containing tank 7 is preferably equipped with a series of baffles 11, the arrangement being such that they provide for the proper admixture of foul and actified solutions in the first division and for the constant circulation of the admixture.

It will be manifest to those skilled in the art that, by the proposed method of forcing regulated quantities of finely divided air into or through the foul solution, I not only effect a more rapid and efficient oxidization, but work a desirable economy in that I am enabled to dispense with considerable apparatus and material heretofore regarded as essential, and that the present system lends itself to a more positive control of the actification of the solution.

At the outset and when starting with a fresh scrubbing solution the sulphur is not always precipitated in proper volume. After the solution has been in use for several days the operation becomes more efficient or may be said to be normalized. On the other hand, if necessary or desirable the immediate precipitation of sulphur can be secured by inoculating the new solution with a previously used scrubbing solution or by adding the equivalent of the soluble iron sulphide in the used solution, i. e., .2 grams per liter of iron in the form of some soluble salt.

The precipitated sulphur may be removed from the solution and recovered in any suitable manner. For example, in the embodiment selected for illustration, 12 indicates a filter press or equivalent apparatus wherein the free sulphur may be recovered and to which a portion of the solution is delivered through the medium of a pump 13, the filter press being equipped with a pipe connection 14 for returning the filtered actified solution to the tank 7. The delivery portion of the pump 13 is equipped with appropriate valve provisions to control the passage of solution to the filter press, to the scrubber, and to the actifier.

The system of baffles 11 is advantageous in that it provides for a desirable division of the actifying tank or cell into successively communicating compartments. This construction and arrangement together with the provision for the return of a portion of the actified solution to the first division of the tank admits of controlling the concentration of hydrogen sulphide in the admixture of foul and actified solution at that point at which the maximum amount of hydrogen sulphide will go to free sulphur with the minimum formation of thio-sulphate. I prefer to keep the initial concentration of hydrogen sulphide in the admixture at between 10 to 15 grains per gallon of solution.

I claim:

1. In the process for purifying gas by the action of a solution of a salt sufficiently alkaline to absorb hydrogen sulphide gas as sulf-hydrate thereby becoming foul and without forming iron sulphide, the improvement which consists in oxidizing the sulf-hydrate principally to the original salt with liberation of sulphur as such, by passing air through the foul solution.

2. In the process for purifying gas by the action of a solution of a salt sufficiently alkaline to absorb hydrogen sulphide gas as sulf-hydrate thereby becoming foul and without forming iron sulphide, the improvement which consists in oxidizing the sulf-hydrate principally to the original salt with liberation of sulphur as such, by passing air in regulated quantities through the foul solution.

3. In the process for purifying gas by the action of a solution of a salt sufficiently alkaline to absorb hydrogen sulphide gas as sulf-hydrate thereby becoming foul and without forming iron sulphide, the improvement which consists in oxidizing the sulf-hydrate principally to the original salt with liberation of sulphur as such, by passing air upwardly through the foul solution.

4. In the process of purifying gas by the action of a solution capable of absorbing hydrogen sulphide gas thereby becoming foul and without forming iron sulphide, the improvement which consists in extracting sulphur as such from the foul solution by subjecting the latter in relatively great depth to the action of air passing upwardly therethrough in a state of subdivision.

5. In the process of purifying gases, the improvement which consists in re-forming the original salt in solutions fouled by the absorption of hydrogen sulphide gas, which consists in removing sulphur as such through the action of air supplied under such conditions that it aids in sustaining a a column of the solution.

6. In the process for purifying gases, the improvement which consists in re-forming the original salt in solutions fouled by the absorption of hydrogen sulphide gas, which consists in removing sulphur as such through the action of air supplied under such conditions that it aids in sustaining a column of the solution, while regulated quantities are caused to pass upwardly through the column.

7. In a process of the nature indicated, that improvement which consists in oxidizing the foul solution by subjecting a moving column thereof to the action of air supplied under selective control through a porous diaphragm.

8. In a process of the nature indicated, that improvement which consists in revivifying the foul solution by establishing a column of the solution over air under pressure and supplying the column with regulated quantities of air in a finely divided state.

9. The process for purifying gas, which consists in scrubbing the gas with a solution capable of absorbing hydrogen sulphide without forming iron sulphide and revivifying the foul solution by subjecting it to an oxidizing environment controllable at will.

10. The process for purifying gas, which consists in scrubbing the gas with a solution capable of absorbing hydrogen sulphide, oxidizing the foul solution to the salts originally present in the fresh solution and to free sulphur, and combining the actified and foul solution without interrupting the circulation of the solution.

11. The process for purifying gas, which consists in scrubbing the gas with a solution capable of absorbing hydrogen sulphide without forming iron sulphide, oxidizing the foul solution under conditions for recovering the free sulphur, and under conditions for maintaining the requisite concentration of hydrogen sulphide in the solution.

12. In processes of gas purification involving the recovery of free sulphur, the improvement which consists in accelerating the sulphur precipitating properties of fresh scrubbing solutions by inoculating them with a factor of predetermined quick-acting nature.

13. In processes of gas purification involving the recovery of free sulphur, the improvement which consists in accelerating the sulphur precipitating properties of fresh scrubbing solutions by inoculating them with a previously used solution.

14. The process of purifying gas, which consists in scrubbing the gas with a relatively weak alkaline solution to thereby form an alkaline sulph hydrate maintaining constant circulation of the solution, including the formation of a relatively deep column thereof capable of differential subdivision, revivifying the solution by impregnating the column with regulated quantities of an oxygen carrying element, and controlling the admixing of the foul and actified solution in one of the subdivisions.

15. In the process of gas purification involving the recovery of free sulphur the improvement which consists in accelerating the sulphur precipitating properties of fresh scrubbing solutions by inoculating them with the dark green solution remaining after a solution of ferrous sulphate has been added to a strongly fouled solution of sodium carbonate and the black insoluble iron sulphate has been settled or filtered out.

16. The process for purifying gas which consists in scrubbing it with a solution of sodium carbonate containing a relatively small quantity of soluble iron salt in a form not precipitatable by hydrogen sulphide thereby absorbing hydrogen sulphide from the gas with the formation of sodium sulphydrate and without forming insoluble iron sulphide, and fitting the solution for reuse by decomposing the sodium sulphydrate by passing subdivided air through the solution thereby reforming the original salt and setting free sulphur as such and uncontaminated and avoiding the liberation of hydrogen sulphide.

In testimony whereof I affix my signature.

WALTER H. FULWEILER.